(12) United States Patent
Maniwa et al.

(10) Patent No.: US 11,015,693 B2
(45) Date of Patent: May 25, 2021

(54) WAVE GEAR DEVICE

(71) Applicant: Harmonic Drive Systems Inc., Tokyo (JP)

(72) Inventors: Kazuaki Maniwa, Chofu (JP); Yoshitomo Mizoguchi, Azumino (JP); Takumi Imada, Neyagawa (JP); Akihiro Orita, Neyagawa (JP)

(73) Assignee: Harmonic Drive Systems Inc., Tokyo (JP)

( * ) Notice: Subject to any disclaimer, the term of this patent is extended or adjusted under 35 U.S.C. 154(b) by 0 days.

(21) Appl. No.: 16/966,770

(22) PCT Filed: Jan. 16, 2019

(86) PCT No.: PCT/JP2019/001052
§ 371 (c)(1),
(2) Date: Jul. 31, 2020

(87) PCT Pub. No.: WO2019/155831
PCT Pub. Date: Aug. 15, 2019

(65) Prior Publication Data
US 2021/0071745 A1 Mar. 11, 2021

(30) Foreign Application Priority Data

Feb. 7, 2018 (JP) .............................. JP2018-020532

(51) Int. Cl.
*F16H 49/00* (2006.01)
(52) U.S. Cl.
CPC ..... *F16H 49/001* (2013.01); *F16H 2049/003* (2013.01)
(58) Field of Classification Search
CPC .................................................... F16H 49/001
See application file for complete search history.

(56) References Cited

U.S. PATENT DOCUMENTS 4,145,798 A * 3/1979 Sarnes ....................... B21J 5/00
148/220
7,748,118 B2 * 7/2010 Kobayashi ............ F16H 49/001
29/893.34

(Continued)

FOREIGN PATENT DOCUMENTS

CN 103547830 A 1/2014
CN 107061689 A 8/2017

(Continued)

OTHER PUBLICATIONS

Maniwa et al., "Study on Lubrication Mechanisms of Strain Wave Gearing", *JAXA Research and Development Report*, Mar. 2007, retrieved on Nov. 27, 2017 Internet <URL : https://repository.exst.jaxa.jp/dspace/handle/a-is/41002>.

(Continued)

*Primary Examiner* — Ha Dinh Ho
(74) *Attorney, Agent, or Firm* — Leason Ellis LLP

(57) ABSTRACT

A wave gear device includes a circular spline that has an annular shape and rigidity; a flex spline that has an annular shape and flexibility, and is disposed in the circular spline; and a wave generator that is disposed in the flex spline, is configured to cause the flex spline to be distorted in a radial direction and is configured to partially mesh with the circular spline, and is configured to move a meshing position between the circular spline and the flex spline in a circumferential direction. The ratio of the Vickers hardness on an inner circumferential surface of the flex spline to the Vickers hardness on an outer circumferential surface of the wave generator is 1.2 or more and 1.7 or less.

5 Claims, 6 Drawing Sheets

(56) References Cited

U.S. PATENT DOCUMENTS

| | | | | |
|---|---|---|---|---|
| 9,435,418 | B2* | 9/2016 | Hoshina | .................. F16C 19/44 |
| 2002/0174741 | A1 | 11/2002 | Kobayashi | |
| 2002/0174742 | A1* | 11/2002 | Kobayashi | .............. F16C 33/60 |
| | | | | 74/640 |
| 2002/0184968 | A1 | 12/2002 | Kobayashi et al. | |

FOREIGN PATENT DOCUMENTS

| | | |
|---|---|---|
| JP | 61-206154 U | 12/1986 |
| JP | 10-019092 A | 1/1998 |
| JP | 2002-340140 A | 11/2002 |
| JP | 2002-349645 A | 12/2002 |
| JP | 2008-180259 A | 8/2008 |
| JP | 4165679 B | 10/2008 |
| JP | 4807689 B | 11/2011 |
| JP | 2015-161346 A | 9/2015 |
| KR | 10-2015-0101388 A | 9/2015 |

OTHER PUBLICATIONS

International Search Report dated Mar. 19, 2019 for the corresponding PCT International Application No. PCT/JP2019/001052.
Written Opinion of the International Search Authority dated Mar. 19, 2019 for corresponding PCT International Application No. PCT/JP2019/001052.
Notice of Allowance dated Oct. 22, 2020 for the corresponding Korean Patent Application No. 10-2020-7022504.
Chinese Office Action dated Feb. 24, 2021 for the corresponding Chinese Patent Application No. 201980011538.3.

* cited by examiner

WAVE GEAR DEVICE

CROSS-REFERENCE TO RELATED PATENT APPLICATIONS

This application is a U.S. National Phase Application under 35 U.S.C. § 371 of International Patent Application No. PCT/JP2019/001052 filed on Jan. 16, 2019 and claims the benefit of priority to Japanese Patent Application No. 2018-020532, filed Feb. 7, 2018, all of which are incorporated herein by reference in their entirety. The International Application was published in Japanese on Aug. 15, 2019 as International Publication No. WO/2019/155831 under PCT Article 21(2).

FIELD OF THE INVENTION

The present invention relates to a wave gear device.

BACKGROUND OF THE INVENTION

In the related art, a wave gear device is used as one of speed reducers (for example, refer to Japanese Patent No. 4165679, Japanese Patent No. 4807689 and Kazuaki MANIWA; Shingo OBARA, "Study on Lubrication Mechanism of Space Strain Wave Gearing", [online], March 2007, Japan Aerospace Exploration Agency Research and Development Report, [retrieved on Nov. 27, 2017], Internet <URL: https://repository.exstjaxa.jp/dspace/handle/a-is/41002>). A typical wave gear device includes an internal gear (circular spline), an external gear (flex spline), and a wave generator.

The circular spline has an annular shape and rigidity. The flex spline has an annular shape and flexibility, and is disposed in the circular spline. The wave generator includes a high-rigidity wave plug having an elliptical contour and a wave bearing fitted around an outer circumference of the wave plug. The flex spline is distorted into an elliptical shape, and external teeth located at both ends in a long axis direction mesh with internal teeth of the circular spline. When the wave generator is rotated by a motor or the like, meshing positions of both splines move in a circumferential direction. As a result, relative rotation of both splines in a circumferential direction occurs due to a difference in the number of teeth between the two splines.

Generally, the difference in the number of teeth between both splines is two, and the circular spline is fixed to a housing or the like of the wave gear device. For this reason, a rotational output greatly reduced based on the difference in the number of teeth is taken out to an outside from the flex spline.

In the wave gear device having this configuration, opening and closing of a gap (squeezing motion) with a small slip occurs between an outer circumferential surface of the wave generator and an inner circumferential surface of the flex spline during operation.

Technical Problem

However, depending on a place where the wave gear device is used, a lubricant may not be used between the outer circumferential surface of the wave generator and the inner circumferential surface of the flex spline, or only a small amount of lubricant may be used therebetween.

Further, in a case where operating conditions of the wave gear device are severe, lubrication of contact surfaces between the wave generator and the flex spline is likely to be insufficient. If the lubrication of the contact surfaces is insufficient, an adverse effect such as seizing occurs.

The present invention has been made in view of such a problem, and an object of the present invention is to provide a wave gear device in which wear resistance of an inner circumferential surface of a flex spline is improved.

SUMMARY OF THE INVENTION

Solution to Problem

A wave gear device of the present invention includes a circular spline that has an annular shape and rigidity; a flex spline that has an annular shape and flexibility, and is disposed in the circular spline; and a wave generator that is disposed in the flex spline, is configured to cause the flex spline to be distorted in a radial direction and is configured to partially mesh with the circular spline, and is configured to move a meshing position between the circular spline and the flex spline in a circumferential direction, wherein a ratio of a Vickers hardness on an inner circumferential surface of the flex spline to a Vickers hardness on an outer circumferential surface of the wave generator is 1.2 or more and 1.7 or less.

According to the present invention, the ratio of a Vickers hardness of the inner circumferential surface of the flex spline to the Vickers hardness of the outer circumferential surface of the wave generator is 1.2 or more and 1.7 or less. For this reason, when the outer circumferential surface of the wave generator and the inner circumferential surface of the flex spline slide with respect to each other, the outer circumferential surface of the wave generator having a relatively low surface hardness is likely to be worn. Therefore, wear resistance of the inner circumferential surface of the flex spline can be improved.

Further, in the above-described wave gear device, an arithmetic average roughness of the inner circumferential surface of the flex spline may be 0.05 $\mu$m or more and 0.1 $\mu$m or less.

According to the present invention, a smooth surface is formed on the inner circumferential surface of the flex spline, and thus occurrence of initial wear powder can be suppressed.

Further, in the above-described wave gear device, a skewness on the inner circumferential surface of the flex spline which is defined by JIS B 0601: 2013, may be −2 or more and −0.3 or less.

According to the present invention, a concave portion functioning as an oil reservoir (a dimple) is formed on the inner circumferential surface of the flex spline. A lubricant stored in the concave portion is unlikely to flow out to outside from the concave portion. With the lubricant in the concave portion, wear between the outer circumferential surface of the wave generator and the inner circumferential surface of the flex spline can be reduced.

Further, in the above-described wave gear device, the flex spline may include a flex spline main body that has an annular shape and flexibility, an external tooth that is provided on an outer circumferential surface of the flex spline main body, and a first hardened layer that is provided on an inner circumferential surface of the flex spline main body, and the thickness of the first hardened layer may be 50 $\mu$m or less, and may be 10% or less of the distance between a root of the external tooth in the flex spline main body and the inner circumferential surface of the flex spline main body.

Generally, a material having a high hardness tends to become brittle. According to the present invention, since the first hardened layer is thin compared to the flex spline main body, by providing the first hardened layer on the inner circumferential surface of the flex spline main body, it is possible to prevent a fatigue strength at the root of the external tooth from being decreased.

Further, in the above-described wave gear device, the flex spline may include a flex spline main body that has an annular shape and flexibility, an external tooth that is provided on an outer circumferential surface of the flex spline main body, and a second hardened layer that is provided on each of an outer surface and a side surface outside the external tooth in a radial direction, and a root of the external tooth in the flex spline main body, along a circumferential direction, and the thickness of the second hardened layer may be 50 μm or less, and may be 10% or less of a distance between the root of the external tooth in the flex spline main body and an inner circumferential surface of the flex spline main body.

According to the present invention, since the second hardened layer is thin compared to the flex spline main body, by providing the second hardened layer on the flex spline main body, it is possible to prevent a fatigue strength at the root of the external tooth from being decreased.

Advantageous Effects of Invention

According to the wave gear device of the present invention, wear resistance of the inner circumferential surface of the flex spline can be improved.

DETAILED DESCRIPTION OF THE INVENTION

First Embodiment

Hereinafter, a wave gear device according to a first embodiment of the present invention will be described with reference to FIGS. 1 to 3.

Figure 1:
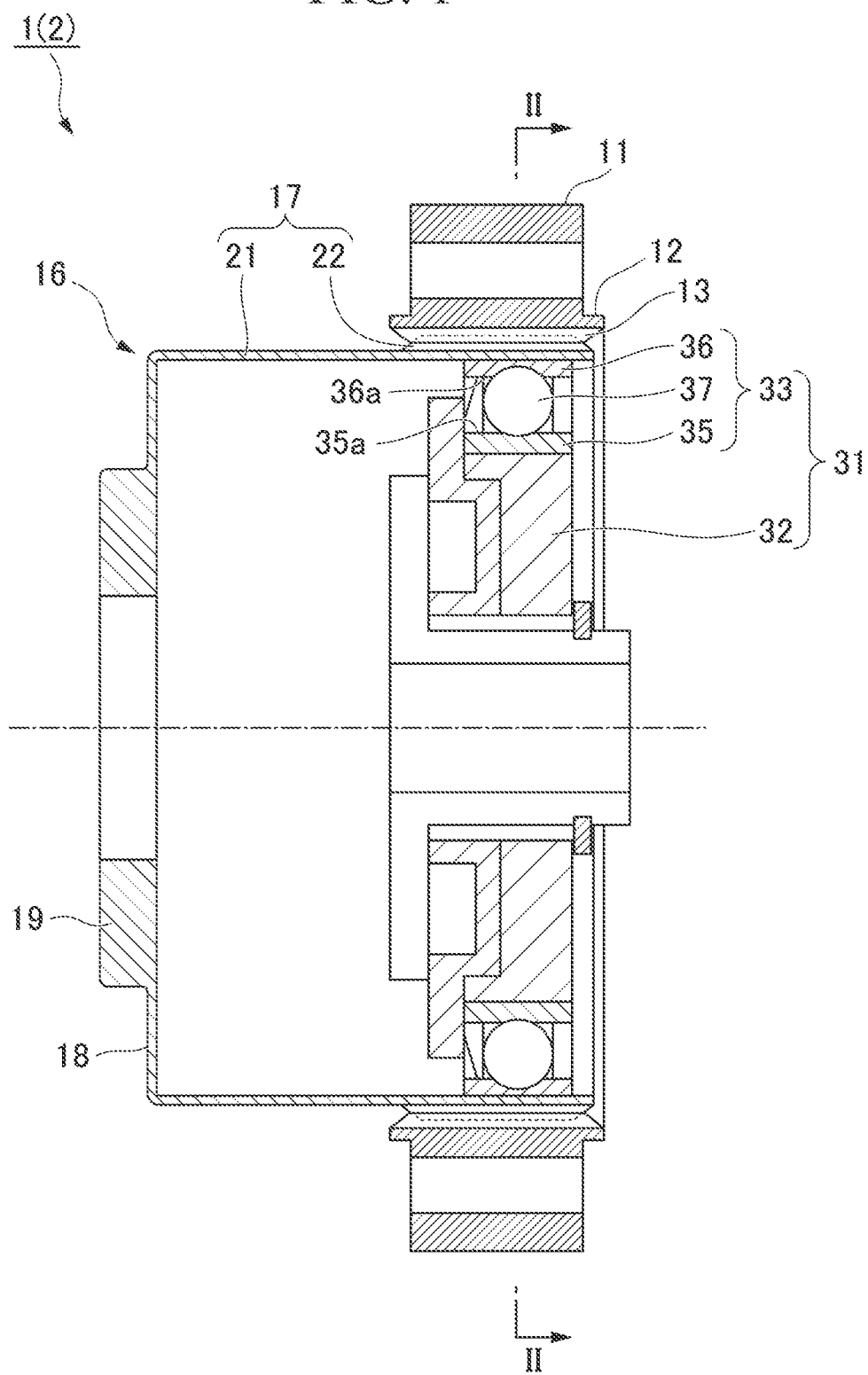
FIG. 1 is a cross-sectional view of a wave gear device according to a first embodiment of the present invention.
Figure 2:
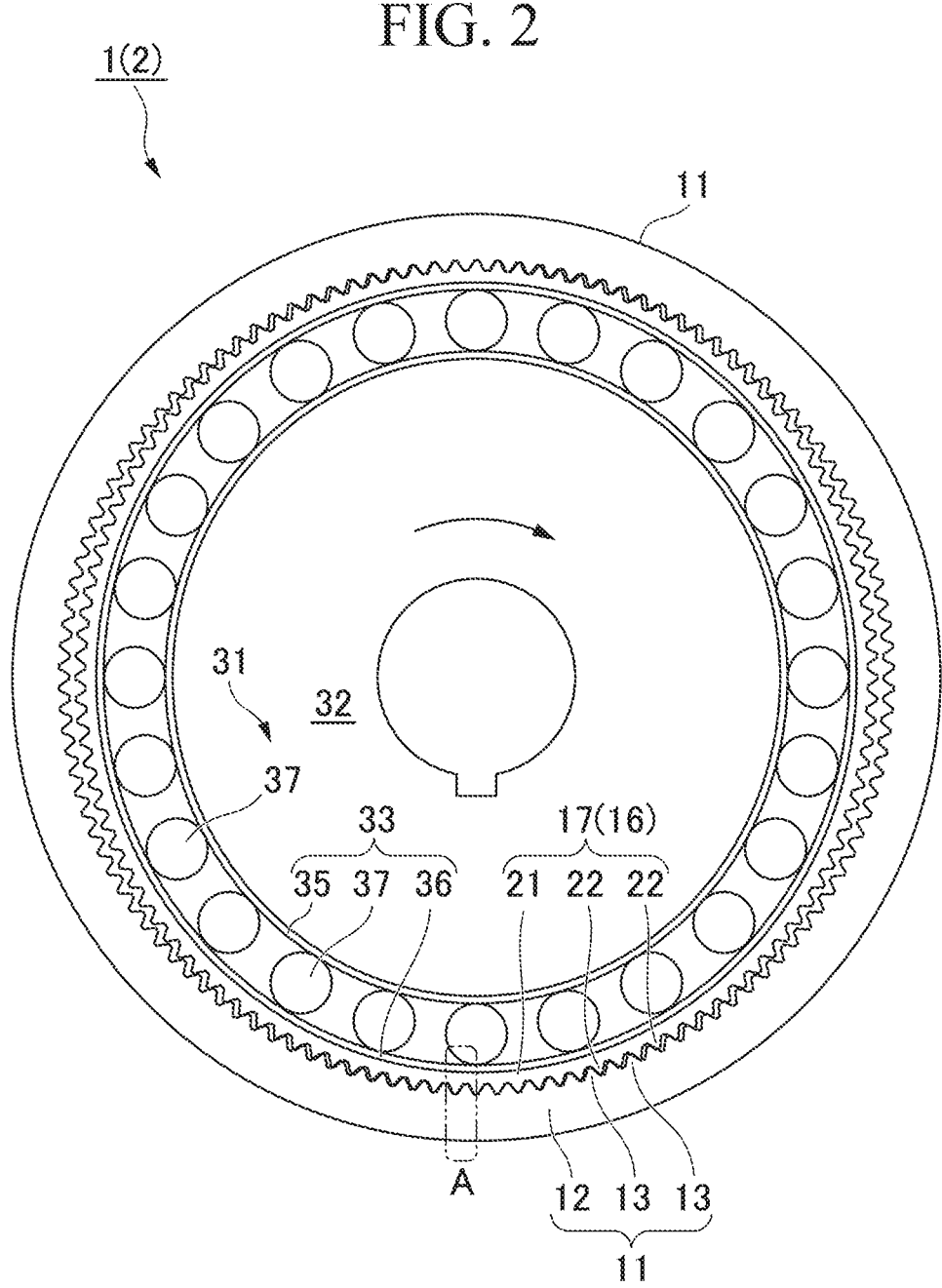
FIG. 2 is a cross-sectional view corresponding to line II-II in FIG. 1.

As shown in FIGS. 1 and 2, the wave gear device 1 of the present embodiment is a so-called cup-shaped wave gear device. The wave gear device 1 includes a circular spline portion (a circular spline) 11, a flex spline portion 16, and a wave generator 31. Note that hatching which indicates a cross section is not shown in FIG. 2.

The circular spline portion 11 has an annular shape and rigidity. As shown in FIGS. 2 and 3, the circular spline 11 includes a circular spline main body 12, a plurality of internal teeth 13, and an internal tooth hardened layer (a third hardened layer) 14.

The circular spline main body 12 has an annular shape and rigidity. The plurality of internal teeth 13 are provided side by side on an inner circumferential surface of the circular spline main body 12 along a circumferential direction of the circular spline main body 12 (hereinafter, simply referred to as a circumferential direction). For example, the circular spline main body 12 and the plurality of internal teeth 13 are integrally formed of stainless steel or the like.

Figure 3:
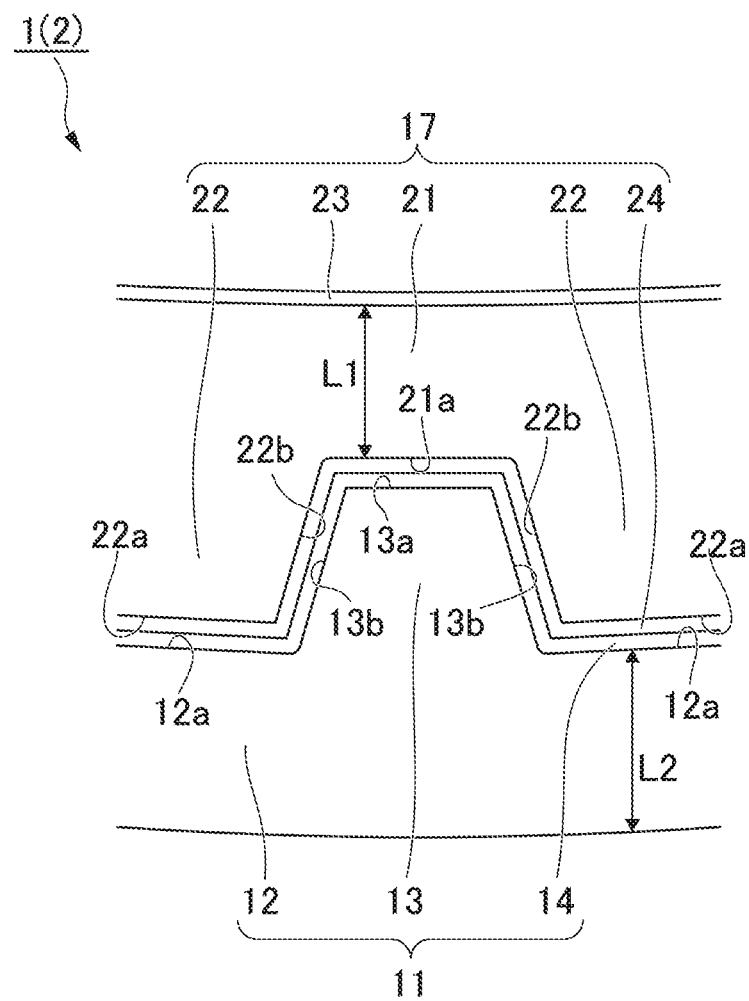
FIG. 3 is an enlarged view of a portion A in FIG. 2.

As shown in FIG. 3, the internal tooth hardened layer 14 is each provided on an outer surface 13a and a side surface 13b inside the plurality of internal teeth 13 in a radial direction of the circular spline main body 12 (hereinafter, simply referred to as a radial direction), and a root 12a of the internal tooth 13 in the circular spline main body 12, along the circumferential direction. A Vickers hardness Hv of the internal tooth hardened layer 14 is larger than a Vickers hardness Hv of each of the circular spline main body 12 and the internal tooth 13.

For example, the internal tooth hardened layer 14 is formed by carburizing or nitriding the circular spline main body 12 and the plurality of internal teeth 13.

As shown in FIGS. 1 and 2, the flex spline portion 16 includes a flex spline 17, a diaphragm 18, and a boss 19.

The flex spline 17 has an annular shape and flexibility. The flex spline 17 is disposed in the circular spline portion 11. As shown in FIGS. 2 and 3, the flex spline 17 includes a flex spline main body 21, a plurality of external teeth 22, an external tooth inside hardened layer (a first hardened layer) 23, and an external tooth outside hardened layer (a second hardened layer) 24.

The flex spline main body 21 has an annular shape and flexibility. The plurality of external teeth 22 are provided side by side on an outer circumferential surface of a first end of the flex spline main body 21 along a circumferential direction. The plurality of external teeth 22 mesh with the plurality of internal teeth 13 of the circular spline portion 11. For example, the flex spline main body 21 and the plurality of external teeth 22 are integrally formed of stainless steel or the like.

The external tooth inside hardened layer 23 is provided on an inner circumferential surface of the first end of the flex spline main body 21.

The thickness (a length in a radial direction) of the external tooth inside hardened layer 23 is 50 μm (micrometer) or less, and is 10% or less of a distance L1 between a root 21a of the external tooth 22 in the flex spline main body 21 and the inner circumferential surface of the flex spline main body 21. The distance L1 and the thickness of the flex spline main body 21 are equivalent to each other.

A Vickers hardness Hv of the external tooth inside hardened layer 23 (an inner circumferential surface of the flex spline 17) is preferably 900 or more and 1200 or less.

As shown in FIG. 3, the external tooth outside hardened layer 24 is each provided on an outer surface 22a and a side surface 22b outside the plurality of external teeth 22 in a radial direction, and a root 21a of the external tooth 22 in the flex spline main body 21, along a circumferential direction.

A Vickers hardness Hv of each of the hardened layers 23, 24 is larger than a Vickers hardness Hv of each of the flex spline main body 21 and the external tooth 22.

For example, the hardened layers 23, 24 are formed by carburizing or nitriding the flex spline main body 21 and the plurality of external teeth 22.

As shown in FIG. 1, the diaphragm 18 is formed in an annular shape. The diaphragm 18 extends inward in a radial direction from an opening edge in a second end of the flex spline main body 21. The boss 19 is formed in an annular shape, and is formed integrally with an inner circumferential edge of the diaphragm 18.

As shown in FIGS. 1 and 2, the wave generator 31 is disposed in the flex spline 17. The wave generator 31 includes a wave plug 32 and a wave bearing 33.

The wave plug 32 has an elliptical contour in an outer shape and rigidity.

The wave bearing 33 has an inner race 35, an outer race 36, and a plurality of balls 37. The inner race 35 is fitted on an outer circumferential surface of the wave plug 32. A ball rolling surface 35a having an arc-shaped cross section orthogonal to a circumferential direction is formed on an outer circumferential surface of the inner race 35.

The outer race 36 is fitted on an inner circumferential surface in the first end of the flex spline main body 21. More specifically, an outer circumferential surface of the outer race 36 is in frictional contact with the inner circumferential surface of the flex spline main body 21. A ball rolling surface 36a having an arc-shaped cross section orthogonal to the circumferential direction is formed on an inner circumferential surface of the outer race 36.

For example, a Vickers hardness Hv of the outer circumferential surface of the outer race 36 is about 700.

The plurality of balls 37 are rotatably inserted between the ball rolling surface 35a of the inner race 35 and the ball rolling surface 36a of the outer race 36.

In the wave generator 31, the first end of the flex spline main body 21 in which the plurality of external teeth 22 are formed is distorted in a radial direction so that the first end becomes elliptical. The external teeth 22 located at both ends in the first end of the flex spline main body 21 in a long axis direction partially mesh with the plurality of internal teeth 13 of the circular spline portion 11.

A ratio of a Vickers hardness in the external tooth inside hardened layer 23 of the flex spline 17 to a Vickers hardness on an outer circumferential surface of the outer race 36 of the wave generator 31 is 1.2 or more and 1.7 or less. This ratio is more preferably 1.3 or more and 1.5 or less, and even more preferably 1.4.

An arithmetic average roughness Ra on an inner circumferential surface of the external tooth inside hardened layer 23 which is defined by JIS B 0601: 2013, is 0.05 μm or more and 0.1 μm or less. The arithmetic average roughness Ra is more preferably 0.07 μm or more and 0.08 μm or less. An arithmetic average roughness Ra is preferably an arithmetic average roughness Ra on the inner circumferential surface of the external tooth inside hardened layer 23 in each of an axial direction of the circular spline main body 12 (hereinafter, simply referred to as an axial direction) and a circumferential direction. Since an arithmetic average roughness Ra is adjusted in this manner, the inner circumferential surface of the external tooth inside hardened layer 23 is a surface that is smooth and unlikely to wear.

A skewness Rsk on an inner circumferential surface of the external tooth inside hardened layer 23 of the flex spline 17 which is defined by JIS B 0601: 2013, is −2 or more and −0.3 or less. The skewness Rsk is more preferably −1.2 or more and −0.7 or less. The skewness Rsk is preferably a skewness Rsk in each of an axial direction and a circumferential direction.

The inner circumferential surface of the external tooth inside hardened layer 23 of the flex spline 17 configured in this manner is a surface which is hard and flat and on which a concave portion functioning as an oil reservoir (a dimple) having no roughness directionality is formed, in contrast to the outer circumferential surface of the outer race 36 of the wave generator 31. A lubricant (not shown) is stored in the concave portion.

When the wave generator 31 of the wave gear device 1 is rotated by a motor or the like, the outer circumferential surface of the outer race 36 of the wave generator 31 and the inner circumferential surface of the external tooth inside hardened layer 23 of the flex spline portion 16 slide with respect to each other. However, wear between the outer circumferential surface of the outer race 36 and the inner circumferential surface of the external tooth inside hardened layer 23, is suppressed by the lubricant stored in the concave portion formed in the external tooth inside hardened layer 23. Since the ratio between a Vickers hardness of the outer ring 36 and a Vickers hardness of the external tooth inside hardened layer 23 is adjusted as described above, the outer circumferential surface of the outer race 36 of the wave generator 31 having a relatively low surface hardness is likely to be worn, the external tooth inside hardened layer 23 having a relatively high surface hardness wears little, and a shape of the oil reservoir is maintained.

Since the skewness on the inner circumferential surface of the external tooth inside hardened layer 23 of the flex spline 17 is adjusted as described above, a trough having a fine roughness which functions as the oil reservoir on the inner circumferential surface of the external tooth inside hardened layer 23 increases in number. For this reason, a lubrication performance between the outer circumferential surface of the outer race 36 and the inner circumferential surface of the external tooth inside hardened layer 23 is improved.

A position at which the plurality of internal teeth 13 of the circular spline portion 11 and the plurality of external teeth 22 of the flex spline portion 16 mesh with each other moves in a circumferential direction. As a result, relative rotation of both splines 11, 16 in a circumferential direction occurs due to a difference in the number of teeth between the circular spline portion 11 and the flex spline portion 16.

Generally, the difference in the number of teeth between both spline portions 11, 16 is two, and the circular spline portion 11 is fixed to a housing or the like of the wave gear device 1. For this reason, a rotational output greatly reduced in a speed based on the difference in the number of teeth between both spline portions 11, 16 is taken out to an outside from an output shaft of the flex spline portion 16.

As in the wave gear device of the related art, when a friction state between the outer circumferential surface of the wave generator and the inner circumferential surface of the flex spline deteriorates, a thrust force acting between the wave generator and the flex spline increases. For this reason, relative displacement of the flex spline and the circular spline in an axial direction occurs, and as a result, wear between the external tooth of the flex spline and the internal tooth of the circular spline is also promoted.

On the contrary, according to the wave gear device 1 of the present embodiment, the ratio of a Vickers hardness Hv of the external tooth inside hardened layer 23 of the flex spline 17 to a Vickers hardness Hv of the outer circumferential surface of the outer race 36 of the wave generator 31 is 1.2 or more and 1.7 or less. For this reason, when the outer circumferential surface of the outer race 36 and the inner circumferential surface of the external tooth inside hardened layer 23 slide with respect to each other, the outer circumferential surface of the outer race 36 having a relatively low surface hardness is worn. Therefore, wear resistance of the inner circumferential surface of the external tooth inside hardened layer 23 can be improved.

An arithmetic average roughness Ra on an inner circumferential surface of the external tooth inside hardened layer 23 of the flex spline 17 is 0.05 µm or more and 0.1 µm or less. Therefore, a smooth surface is formed on the inner circumferential surface of the flex spline 17, and thus occurrence of initial wear powder can be suppressed.

Since the inner circumferential surface of the external tooth inside hardened layer 23 on which the concave portion is formed is hard, the oil reservoir is maintained on a contact surface for a long period of time. As a result, the lubricant remains between the contact surfaces for a long period of time, and wear resistance under boundary lubrication can be improved.

When friction and wear between the outer circumferential surface of the wave generator 31 and the inner circumferential surface of the flex spline 17 are reduced, a thrust force acting between the wave generator 31 and the flex spline 17 is reduced, and thus wear between the external teeth 22 of the flex spline 17 and the internal teeth 13 of the circular spline portion 11 can be suppressed.

The skewness Rsk on the inner circumferential surface of the external tooth inside hardened layer 23 of the flex spline 17 is −2 or more and −0.3 or less. The concave portion functioning as the oil reservoir is formed on the inner circumferential surface of the flex spline 17. A lubricant stored in the concave portion is unlikely to flow out to outside from the concave portion. With the lubricant in the concave portion, wear between the outer circumferential surface of the wave generator 31 and the inner circumferential surface of the flex spline 17 can be reduced.

The thickness of the external tooth inside hardened layer 23 is 50 µm or less, and is 10% or less of a distance L1 between a root 21a of the external tooth 22 and the inner circumferential surface in the flex spline main body 21. Generally, a material having a high hardness tends to become brittle. Since the external tooth inside hardened layer 23 is thin compared to the flex spline main body 21, by providing the external tooth inside hardened layer 23 on the inner circumferential surface of the flex spline main body 21, it is possible to prevent a fatigue strength at the root of the external tooth 22 from being decreased.

Second Embodiment

Next, a second embodiment of the present invention is described with reference to FIG. 3. Portions which are the same as those in the above embodiment are assigned to the same reference numerals, description thereof is omitted, and only different points are described.

A wave gear device 2 of the present embodiment shown in FIG. 3 is different from the wave gear device 1 of the first embodiment in the following configuration.

A Vickers hardness Hv of each of the internal tooth hardened layer 14 and the external tooth outside hardened layer 24 is 900 or more and 1200 or less. An arithmetic average roughness Ra of each of the inner circumferential surface of the internal tooth hardened layer 14 and the outer circumferential surface of the external tooth outside hardened layer 24 is 0.3 µm or less.

The thickness of the internal tooth hardened layer 14 is 50 µm or less.

The thickness of the external tooth outside hardened layer 24 is 50 µm or less, and is 10% or less of a distance L1 in the flex spline main body 21 as described above.

According to the wave gear device 2 of the present embodiment configured in this manner, wear resistance of the inner circumferential surface of the flex spline 17 can be improved.

Further, the thickness of the external tooth outside hardened layer 24 is 50 µm or less, and is 10% or less of a distance L1 in the flex spline main body 21. Since the external tooth outside hardened layer 24 is thin compared to the flex spline main body 21, by providing the external tooth outside hardened layer 24 on the flex spline main body 21, it is possible to prevent a fatigue strength at the root 21a of the external tooth 22 from being decreased.

The thickness of the internal tooth hardened layer 14 is 50 µm or less.

Since a Vickers hardness Hv of each of the internal tooth hardened layer 14 and the external tooth outside hardened layer 24 is 900 or more and 1200 or less, wear between the plurality of internal teeth 13 of the circular spline portion 11 and the plurality of external teeth 22 of the flex spline portion 16 can be reduced.

An arithmetic average roughness Ra of each of the inner circumferential surface of the internal tooth hardened layer 14 and the outer circumferential surface of the external tooth outside hardened layer 24 is 0.3 µm or less. By reducing a surface roughness of each of the inner circumferential surface of the internal tooth hardened layer 14 and the outer circumferential surface of the external tooth outside hardened layer 24, wear between the plurality of internal teeth 13 of the circular spline portion 11 and the plurality of external teeth 22 of the flex spline portion 16 can be reduced.

Generally, as a torque applied to the output shaft of the wave gear device increases, wear on a tooth surface increases. The wave gear device 2 of the present embodiment is effective in a case where a load torque of 10% or more of a rated torque is applied. With the configuration of the wave gear device 2, wear of the tooth surface of the wave gear device 2 can be suppressed.

As described above, although the first embodiment and the second embodiment of the present invention have been described in detail with reference to the drawings, a specific configuration is not limited to these embodiments and includes change, combination, deletion, or the like of the constituents without departing from the scope of the present invention. Further, it goes without saying that the configurations shown in the embodiments can be used in appropriate combinations.

For example, in the first embodiment and the second embodiment, if a ratio of a Vickers hardness in the external tooth inside hardened layer 23 of the flex spline 17 to a Vickers hardness on an outer circumferential surface of the outer race 36 of the wave generator 31 is 1.2 or more and 1.7 or less, an arithmetic average roughness Ra of the inner circumferential surface of the external tooth inside hardened layer 23 may be less than 0.05 µm, or may be more than 0.1 µm.

A skewness Rsk on the inner circumferential surface of the external tooth inside hardened layer 23 of the flex spline 17 may be less than −2, or may be more than −0.3.

The thickness of each of the hardened layers 23 and 24 may be more than 50 µm, or may be more than 10% of the thickness of the flex spline main body 21. The thickness of the internal tooth hardened layer 14 may be more than 50 μm.

The shape of the diaphragm 18 is not limited to a shape of FIG. 1.

(Experiment Results)

Hereinafter, experiment results using an example and a comparative example will be described.

In a wave gear device of the example, each constituent was manufactured with the following specifications for the wave gear device of the first embodiment.

The circular spline portion was manufactured using SUS630 which is a precipitation hardened stainless steel.

The flex spline portion was manufactured using 15-5PH which is a precipitation hardened stainless steel.

The inner race, the outer race, and the ball of the wave generator were manufactured using SUS440C, which is a martensitic stainless steel.

By performing plasma carburizing treatment on the inner circumferential surface and the external tooth of the flex spline, and the internal tooth of the circular spline portion, the external tooth inside hardened layer, the external tooth outside hardened layer, and an internal tooth hardened layer were formed. This treatment increased a surface hardness of each of the circular spline main body and the flex spline main body. Note that adjustment of the surface hardness may be performed by nitriding treatment, a diamond like carbon (DLC) film, and the like.

By performing two-stage shot peening treatment on the inner circumferential surface and the external tooth of the flex spline, and the internal tooth of the circular spline portion, an arithmetic average roughness Ra of each surface was adjusted. By this treatment, a compressive residual stress was given, and the surface was polished. Note that adjustment of an arithmetic average roughness Ra may be performed by machining.

Figure 4:
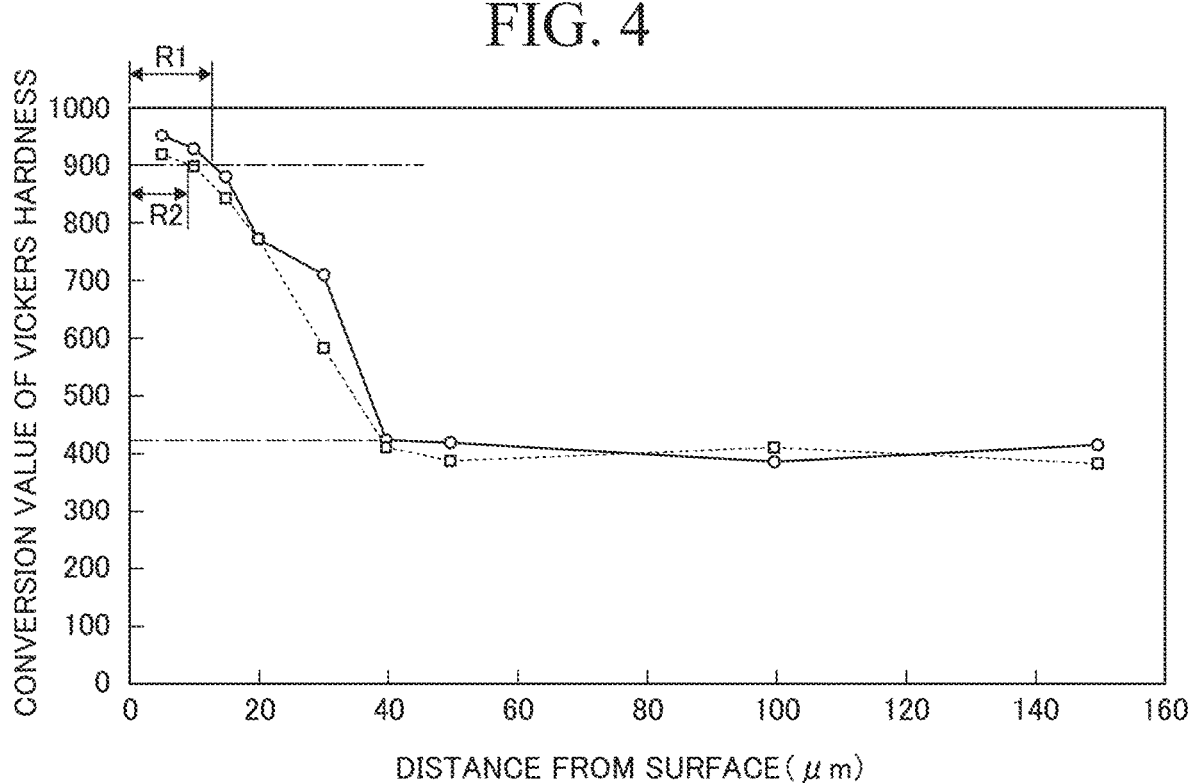
FIG. 4 is a diagram showing a measurement result of a conversion value of a hardness according to a distance from a surface in a flex spline of the wave gear device of an example.

FIG. 4 shows a measurement result of a hardness according to a distance from a surface in a flex spline of the wave gear device of an example. In FIG. 4, a horizontal axis represents a distance (μm) from the surface of the flex spline, and a vertical axis represents a conversion value of a Vickers hardness Hv. A mark "○" in the figure indicates the measurement result on the external tooth of the flex spline, and a mark "□" in the figure indicates the measurement result on the inner circumferential surface of the flex spline.

Measurement of a hardness was performed by a nanoindentation method. An indenter used was a triangular pyramid Berkovich indenter. A hardness measured by the nanoindentation method was converted to a Vickers hardness Hv.

A conversion value of a Vickers hardness Hv in the flex spline main body as a base material is about 420.

For example, in the external tooth outside hardened layer, a conversion value of a Vickers hardness Hv in a portion of the external tooth of the flex spline of which a surface hardness is increased, is in a range R1 of 900 or more. In the external tooth inside hardened layer, a conversion value of a Vickers hardness Hv in a portion of the inner circumferential surface of the flex spline of which a surface hardness is increased, is in a range R2 of 900 or more.

In this example, the thickness of the external tooth outside hardened layer is about 15 μm, and the thickness of the external tooth inside hardened layer is about 10 μm. For example, the thickness of the flex spline main body is 200 μm to 300 μm. The thickness of each of both hardened layers satisfies a condition of 50 μm or less and 10% or less of the thickness of the flex spline main body.

Figure 5:
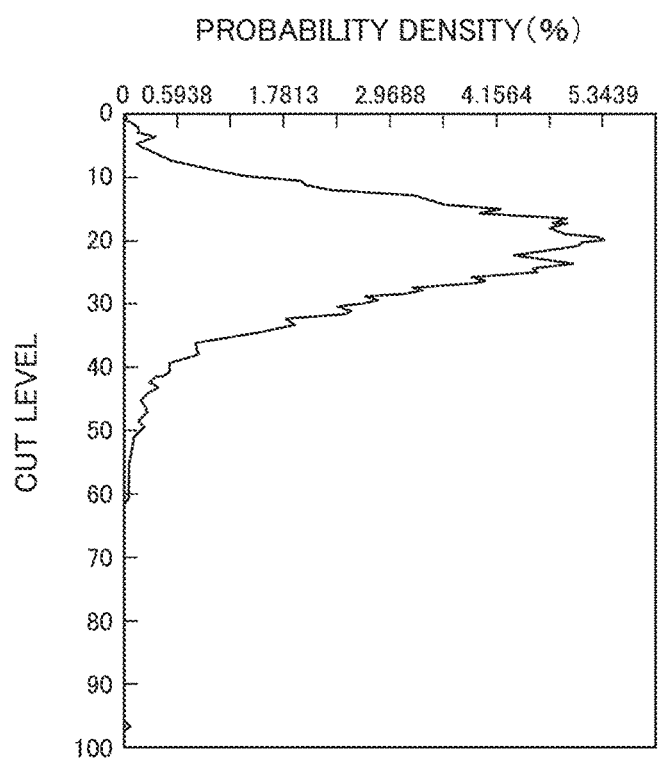
FIG. 5 is a diagram showing a probability density function of a surface roughness in a circumferential direction of an inner circumferential surface in the flex spline of the wave gear device of the example.

FIG. 5 shows a probability density function of a surface roughness in a circumferential direction of the inner circumferential surface in the flex spline of the wave gear device of the example. In FIG. 5, a horizontal axis represents a probability density (%), and a vertical axis represents a cut level.

A surface roughness was measured by a stylus type surface roughness measuring device. A stylus of 2 pmR formed of a diamond was moved at a speed of 0.03 mm/s (millimeters per second) to measure a surface roughness. In this case, a skewness Rsk was −1.1.

Figure 6:
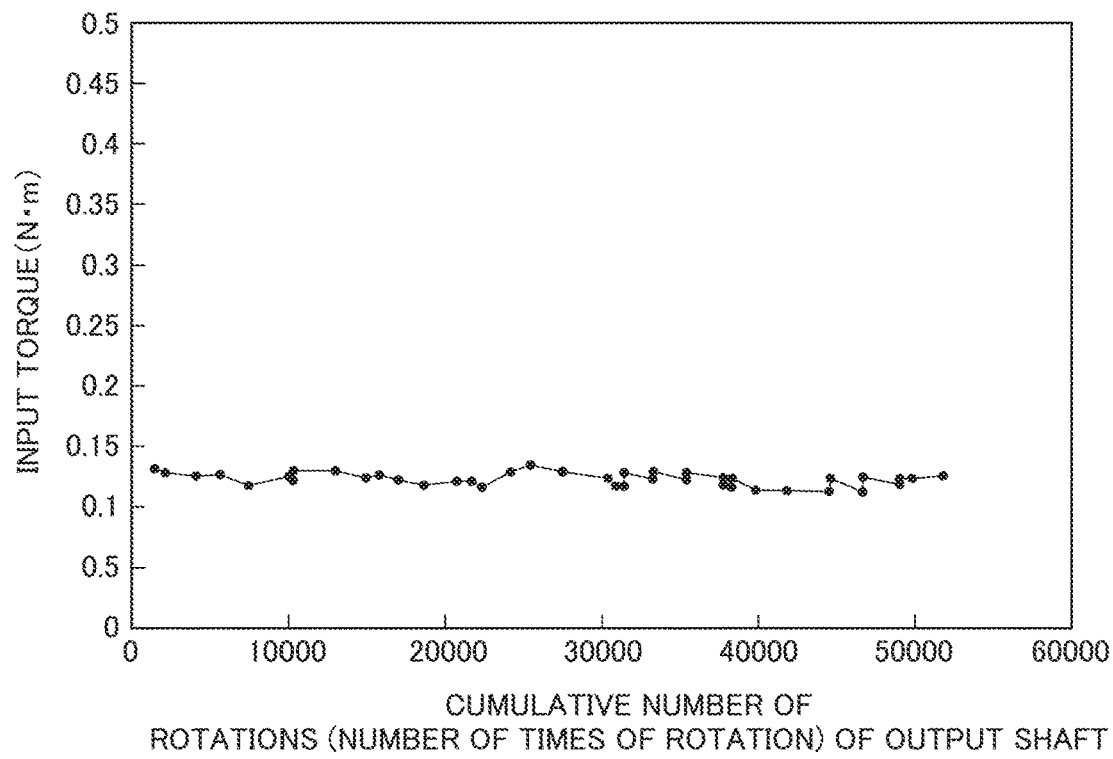
FIG. 6 is a diagram showing change in an input torque with respect to a cumulative number of rotations of an output shaft in the wave gear device of the example.

FIG. 6 is a diagram showing change in an input torque with respect to a cumulative number of rotations of the output shaft using the wave gear device of the example. A horizontal axis represents a number of rotations of the output shaft of the flex spline portion (rotation times corresponding to time). A vertical axis represents an input torque to the wave generator (N·m (newton meters) corresponding to friction). The wave gear device used in the experiment has a model number of 20 (an inner diameter of the flex spline is about 50 mm) and a reduction ratio of 1/160.

In this experiment, it was stipulated that when an input torque was increased by 50% compared to an initial input torque, the wave gear device was unlikely to rotate and the wave gear device reached its end of a lifespan.

Note that the experiment using the wave gear device of the example was performed in a vacuum. Generally, a lubrication lifespan of a wave gear device is decreased to one-tenth or less in a vacuum compared to in an atmosphere. In a vacuum, a sliding portion wears out sooner, so that a transmission efficiency of the wave gear device decreases, an angle transmission accuracy deteriorates, and a spring constant decreases.

As a result of the experiment, it was found that an input torque was at a low level equivalent to an initial input torque even if a number of rotations of the output shaft reached 516,000. This lifespan was found to be 14.7 times (=51.6/3.5) or more that of a wave gear device of a comparative example described later.

When the wave gear device was observed after the end of the experiment, only very little wear was found on the outer circumferential surface of the wave generator and the inner circumferential surface of the circular spline. Even when slight wear was founded on the external tooth of the flex spline portion and the internal tooth of the circular spline portion, the flex spline portion and the circular spline portion were in a state of being rotatable with each other. The amount by which an angular transmission error increased after the experiment was 20%.

Figure 7:
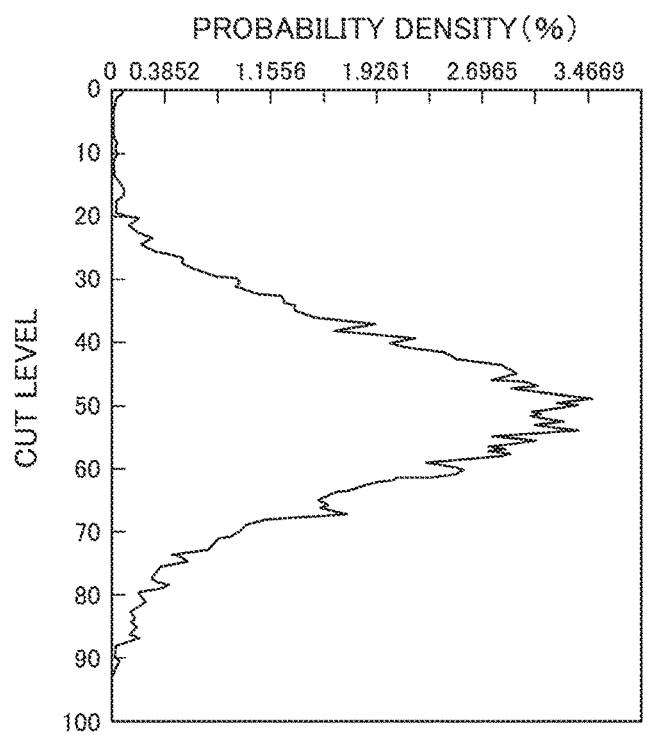
FIG. 7 is a diagram showing a probability density function of a surface roughness in a circumferential direction of an inner circumferential surface in a flex spline of a wave gear device of a comparative example.

On the contrary, FIG. 7 shows a probability density function of a surface roughness in a circumferential direction of the inner circumferential surface in the flex spline of the wave gear device of the related art of a comparative example. In FIG. 7, a horizontal axis represents a probability density (%), and a vertical axis represents a cut level. A surface roughness was measured in the same manner as in the wave gear device of the above-described example. In this case, a skewness Rsk was −0.03.

Figure 8:
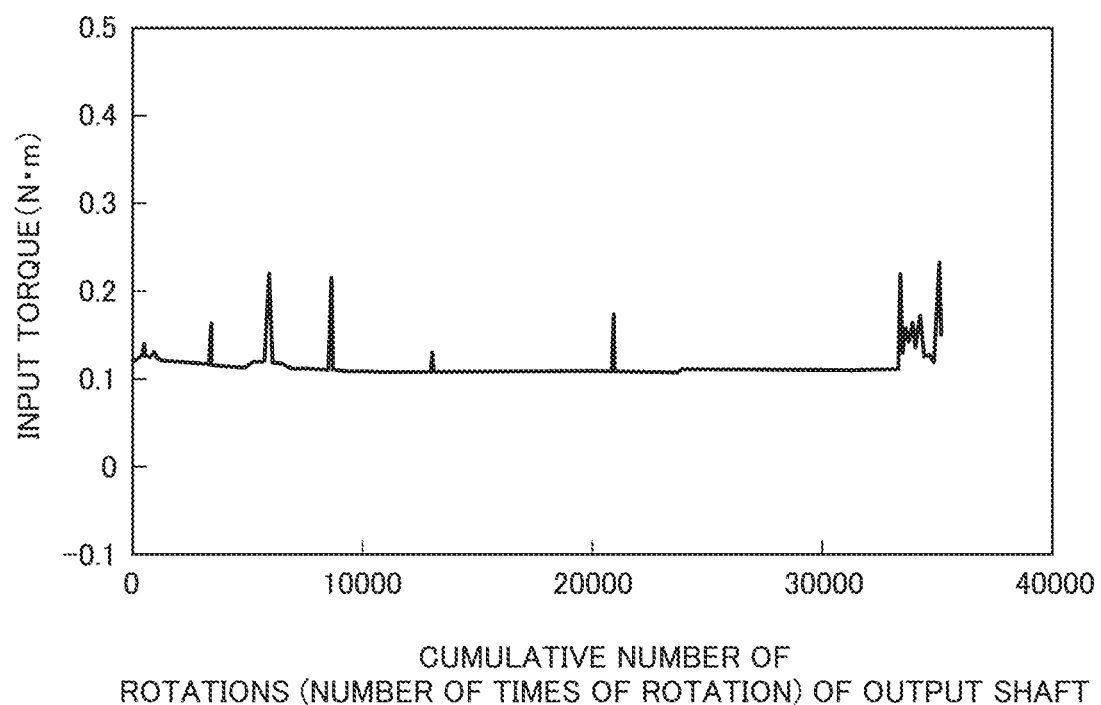
FIG. 8 is a diagram showing change in an input torque with respect to a cumulative number of rotations of an output shaft in the wave gear device of the comparative example.

FIG. 8 is a diagram showing change in an input torque with respect to a cumulative number of rotations of the output shaft using the wave gear device of the comparative example. A horizontal axis represents a number of rotations (number of times of rotation) of the output shaft of the flex spline portion, and a vertical axis represents an input torque (N·m) to the wave generator. This result is extracted from Keiji Ueura, et al., "DEVELOPMENT OF STRAIN WAVE GEARING FOR SPACE APPLICATIONS", Proc. '12th Euro. Space Mechanisms & Tribology Symp. (ESMATS)', Liverpool, UK, 19-21 Sep. 2007 (ESA SP-653, August 2007).

The wave gear device lubricated with grease was rotated in a vacuum to examine the lifespan. The result was that an input torque increased when a number of rotations reached about 35,000, and the wave gear device reached a lubrication life.

When the wave gear device was observed after the end of the experiment, severe wear was found on the outer circumferential surface of the wave generator, the inner circumferential surface of the flex spline portion, the external tooth of the flex spline portion, and internal tooth of the circular spline portion. The amount by which an angular transmission error increased after the experiment was by two times or more.

INDUSTRIAL APPLICABILITY

According to the wave gear device as described above, wear resistance of the inner circumferential surface of the flex spline can be improved.

REFERENCE SIGNS LIST 1, 2 Wave gear device
11 Circular spline portion (circular spline)
17 Flex spline
21 Flex spline main body
21a Root
22 External tooth
22a Outer surface
22b Side surface
23 External tooth inside hardened layer (first hardened layer)
24 External tooth outside hardened layer (second hardened layer)
31 Wave generator
L1, L2 Distance

What is claimed is:

1. A wave gear device comprising:
a circular spline that has an annular shape and rigidity;
a flex spline that has an annular shape and flexibility, and is disposed in the circular spline; and
a wave generator that is disposed in the flex spline, is configured to cause the flex spline to be distorted in a radial direction and is configured to partially mesh with the circular spline, and is configured to move a meshing position between the circular spline and the flex spline in a circumferential direction,
wherein a ratio of a Vickers hardness on an inner circumferential surface of the flex spline to a Vickers hardness on an outer circumferential surface of the wave generator is 1.2 or more and 1.7 or less.

2. The wave gear device according to claim 1, wherein an arithmetic average roughness of the inner circumferential surface of the flex spline is 0.05 µm or more and 0.1 µm or less.

3. The wave gear device according to claim 1, wherein
a skewness on the inner circumferential surface of the flex spline which is defined by JIS B 0601: 2013, is −2 or more and −0.3 or less.

4. The wave gear device according to claim 1,
wherein the flex spline includes;
a flex spline main body that has an annular shape and flexibility,
an external tooth that is provided on an outer circumferential surface of the flex spline main body, and
a first hardened layer that is provided on an inner circumferential surface of the flex spline main body, and
wherein a thickness of the first hardened layer is 50 µm or less, and is 10% or less of a distance between a root of the external tooth in the flex spline main body and the inner circumferential surface of the flex spline main body.

5. The wave gear device according to claim 1,
wherein the flex spline includes
a flex spline main body that has an annular shape and flexibility,
an external tooth that is provided on an outer circumferential surface of the flex spline main body, and
a second hardened layer that is provided on each of an outer surface and a side surface outside the external tooth in a radial direction, and a root of the external tooth in the flex spline main body, along a circumferential direction, and
wherein a thickness of the second hardened layer is 50 µm or less, and is 10% or less of a distance between the root of the external tooth in the flex spline main body and an inner circumferential surface of the flex spline main body.

* * * * *